Nov. 3, 1953     O. FALK     2,657,577
APPARATUS FOR MEASURING THE LEVEL OF LIQUIDS
Filed Nov. 25, 1949     3 Sheets-Sheet 1

INVENTOR:
OLAF FALK
BY K. A. Mayr
ATTORNEY

INVENTOR:
OLAF FALK
BY K. A. Mayr
ATTORNEY.

Patented Nov. 3, 1953

2,657,577

UNITED STATES PATENT OFFICE 2,657,577

APPARATUS FOR MEASURING THE LEVEL OF LIQUIDS

Olaf Falk, Oslo, Norway, assignor to Askania-Werke Aktiengesellschaft, Berlin, Friedenau, Germany, a corporation of Germany Application November 25, 1949, Serial No. 129,241

5 Claims. (Cl. 73—212)

The present invention relates to an apparatus for measuring the level of liquids.

The primary object of my invention is to provide an apparatus permitting to measure the level of a fluid with a greater accuracy than this was possible hitherto.

Another object of my invention is to provide an apparatus permitting to record with a great accuracy the variations of the level of a liquid.

Still another object of my invention is to combine two such apparatus for measuring the flow output of a liquid flowing through a channel having a cross section of known shape and size, the one of these apparatus measuring the level of the liquid in the channel, whilst the other apparatus measures the level of liquid indicating the hydrodynamic pressure of the moving liquid, further means responsive to these two apparatus indicating the flow velocity.

Other objects of my invention will appear hereinafter as the description of the invention proceeds, the novel features, combinations and construction being more particularly pointed out in the specification and the claims hereunto appended.

The annexed drawings diagrammatically illustrate several modifications of apparatus according to my invention.

Figure 1:
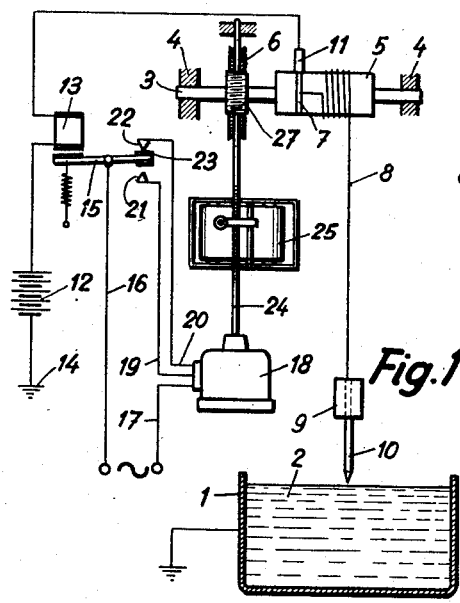
Fig. 1 is a diagrammatical illustration of a first embodiment of the invention.

In Fig. 1 of the drawings, a reservoir 1 is shown containing an electricity-conducting liquid 2 the level of which is to be measured for example before and after having fed a quantity of liquid to the reservoir.

The apparatus comprises a shaft 3 journalled in fixed bearings indicated at 4. A drum 5 of insulating material and a toothed wheel 6 of a worm gearing are both rigidly keyed onto the shaft 3. A metallic slip ring 7 is fixed to the drum 5 and connected with a fine metallic wire 8 which is rolled and unrolled as the drum 5 is rotated in one or other direction. A weight 9 is connected to the lower end of the wire 8 and traversed by a contact rod 10 electrically connected to said wire 8. A fixed brush 11 slipping on the ring 7 is connected to one end of the solenoid coil 13 of an ultra-sensitive relay, the other end being connected to one pole of the current source 12 the other pole being grounded at 14. The pivot of the spring-loaded armature lever 15 of said relay is connected by a conductor 16 to one phase of an alternating-current network, the other phase being connected by a conductor 17 to one of the terminals of a reversible electric motor 18. The other two terminals of the latter are connected by conductors 19 and 20, to fixed contacts 21, 22 alternatively cooperating with the movable contact 23 fixed to the armature lever 15. The shaft 24 of the motor 18 is connected by a revolution counter or recording device 25 with the shaft 26 to which the worm 27 of the already cited worm gearing is rigidly fixed.

The operation is as follows:

As long as the contact rod 10 does not touch the surface of the liquid 2, the energizing circuit of the relay winding 13, comprising said contact rod 10 and the liquid 2, is open. The spring-loaded armature lever 15 then urges its movable contact 23 onto the fixed contact 22, causing the motor 18 to revolve its shaft 24, the shaft 3 and the drum 5 in such a direction as to unroll the wire 8 and to lower the contact rod 10 onto the surface of the liquid 2. As soon as the rod 10 contacts the surface of the liquid, the energizing circuit of the relay 13 is established and causes the movable relay contact 23 to be moved onto the contact 21 and the motor 18 and consequently the drum 5 to rotate in the opposite direction. The wire 8 is then rolled up and the contact between the rod 10 and the liquid 2 cut off, so that the revolving direction of the motor shaft 24 and of the drum 5 is reversed once more. When the surface of the liquid does not vary, these alternative movements are continued. By proper design of the apparatus the extent of these movements can be made very small and consequently, the measuring accuracy very great. When the liquid level varies, the tip of the rod 10 follows these variations very closely. The amount of these variations is proportional to the number of revolutions of the shafts 24, 26, indicated by the device 25. The current passing through the contact rod 10 and the liquid 2 may be amplified in some appropriate electronic amplifier before passing the relay 13. Instead of using a reversible motor 18, a reversing gearing and a pair of electromagnetic clutches controlled by said relay may be used, as shown in a further embodiment yet to be described.

Figure 2:
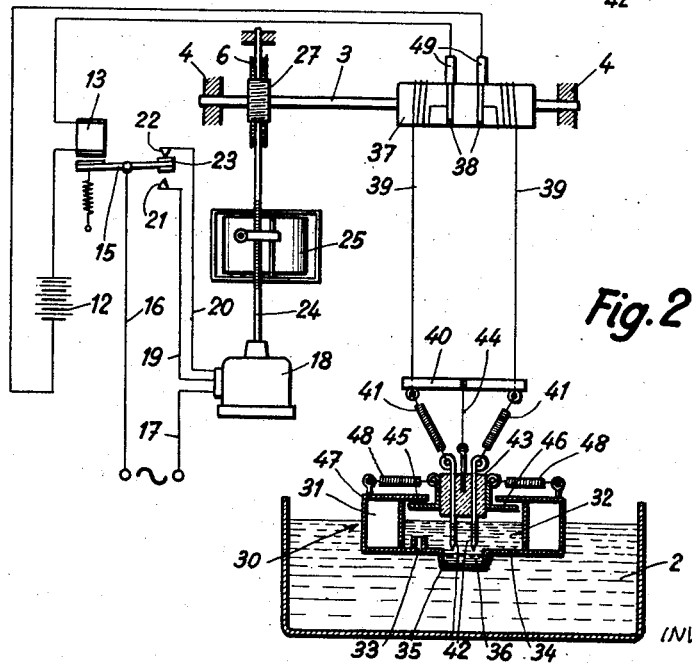
Fig. 2 is a diagrammatical, partly sectional illustration of a second embodiment.

If the liquid the level of which is to be measured is a non-conductor, an apparatus like that shown by Fig. 2 may be used. This apparatus comprises a float generally indicated at 30. The float comprises a closed ring chamber 31 and a central chamber 32 in which the liquid may take the same level as the surrounding liquid, owing to a communication pipe 33 protruding from the bottom wall 34 of the chamber 32. The central portion 35 is shaped as a vessel for a small quantity of a conductor liquid 36 heavier than the liquid 2, of mercury for example.

The shaft 3 journalled at 4 now carries besides the wheel 6, a drum 37 of insulating material, the middle portion of which is fitted with two slip rings 38. Metallic wires 39 rolled on the drum 37 on both sides of the slip rings 38 to which they are individually connected, interlace the ends of an insulating bar 40 and have somewhat coiled lower ends 41 individually connected to two contact rods 42 traversing a weight 43 made of insulating material. This weight is suspended from the bar 40 by means of a wire 44. Flanges 45 and 46 secured to the weight 43 and to the upper wall 47 of float, are intended to engage each other when the float 30 is taken from the liquid 2'. Springs 48 attached to the weight and to the float vertically yieldingly maintain these parts in such a position with respect to each other that the points of the contact rods 42, when lowered, touch the conductor liquid 36, the evaporation of which is prevented by the liquid contained in the central chamber 32.

The wires 39, the contact rods 42 and the slip rings 38 cooperating with brushes 49, are set in the energizing circuit of the relay winding 13 together with the current source 12. The remaining portion of the apparatus, comprising the relay armature and contacts, the conductors 19, 20, 16, 17, the reversible motor 18, the counting or recording device 25 and the worm 27 meshing with the worm wheel 6, is similar to the corresponding portion of the first embodiment hereabove described.

The operation of this apparatus differs from that shown by Fig. 1 only in that the current energizing the relay winding 13 passes through two slip rings 38, two wires 39, two contact rods 42 and a conductor liquid 36 contained in a vessel of a float.

Figure 3:
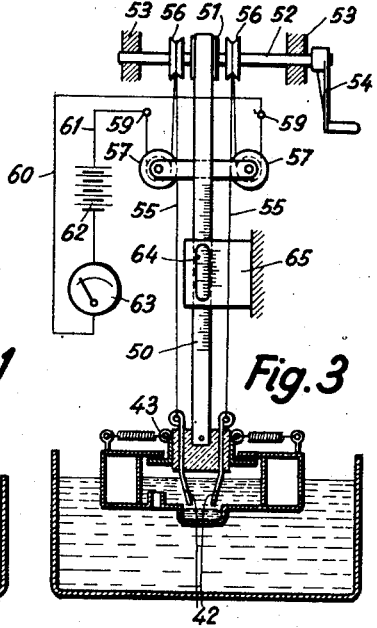
Fig. 3 is a diagrammatical illustration of a third embodiment.

Whilst both preceding embodiments work automatically, that of Fig. 3 is more simple and is operated by hand. The weight 43' fitted with contact rods is attached to the lower end of a measuring tape 50 the upper portion of which is rolled on a narrow drum 51 which is rigidly fixed to an axle 52 journalled at 53 and provided with a crank 54 at one of its ends. Two metallic wires 55 connected to the upper ends of the contact rods 42 pass over two pulleys 56 made of insulating material and loosely mounted on the axle 52, then pass over two pulleys 57 also made of insulating material and pivoted on a somewhat heavy transverse bar 58 (for stressing the wires) and are connected to fixed terminals 59 of a current-flow-indicating device comprising conductors 60, 61, a current source 62 and an amperemeter or voltmeter 63, a bell or the like. The measuring tape 50 moves behind the window 64 of a fixed member 65, which may be provided with graduated index means along the window.

The operation is as follows:

The crank 54 is actuated to lower or elevate the weight 43 so that the contact rods 42 touch the conductor liquid 36, this being indicated by the instrument 63, and the tape 50 appearing in the opening 64 is read before and after each feeding of liquid 2' to or from the reservoir 1. The tape 50 may indicate the level of the liquid 2' (in millimeters or inches) and/or the quantity of liquid contained in the reservoir.

It is well known to those skilled in the art that the velocity of a flowing fluid can be measured by measuring its hydrodynamic pressure, this pressure being indicated by a liquid contained in a gauging tube. The level of this liquid may easily be measured by the apparatus according to my invention and, therefore, this apparatus may well be used for measuring and possibly recording the flow velocity of a fluid.

In a further embodiment, now to be described, I have provided facilities permitting to measure and to record the quantity of a liquid flowing through a channel or the like at a cross-section of known shape. For this purpose I use two apparatus as those set out hereabove, the one for measuring the level of the flowing liquid, the other for measuring the hydrodynamic pressure by means of a conventional device. In known apparatus for measuring the velocity of a liquid flowing through a channel and having a free level subject to variations, measuring-faults are produced in the velocity measurement on the ground that said variations interfere in the measurement of the hydrodynamic pressure, in that the sum of these variations and of those of the hydrodynamic pressure is read in the gauging tube intended to indicate the variations of the hydrodynamic pressure only. Errors of this kind are eliminated by the following arrangements.

Figure 5:
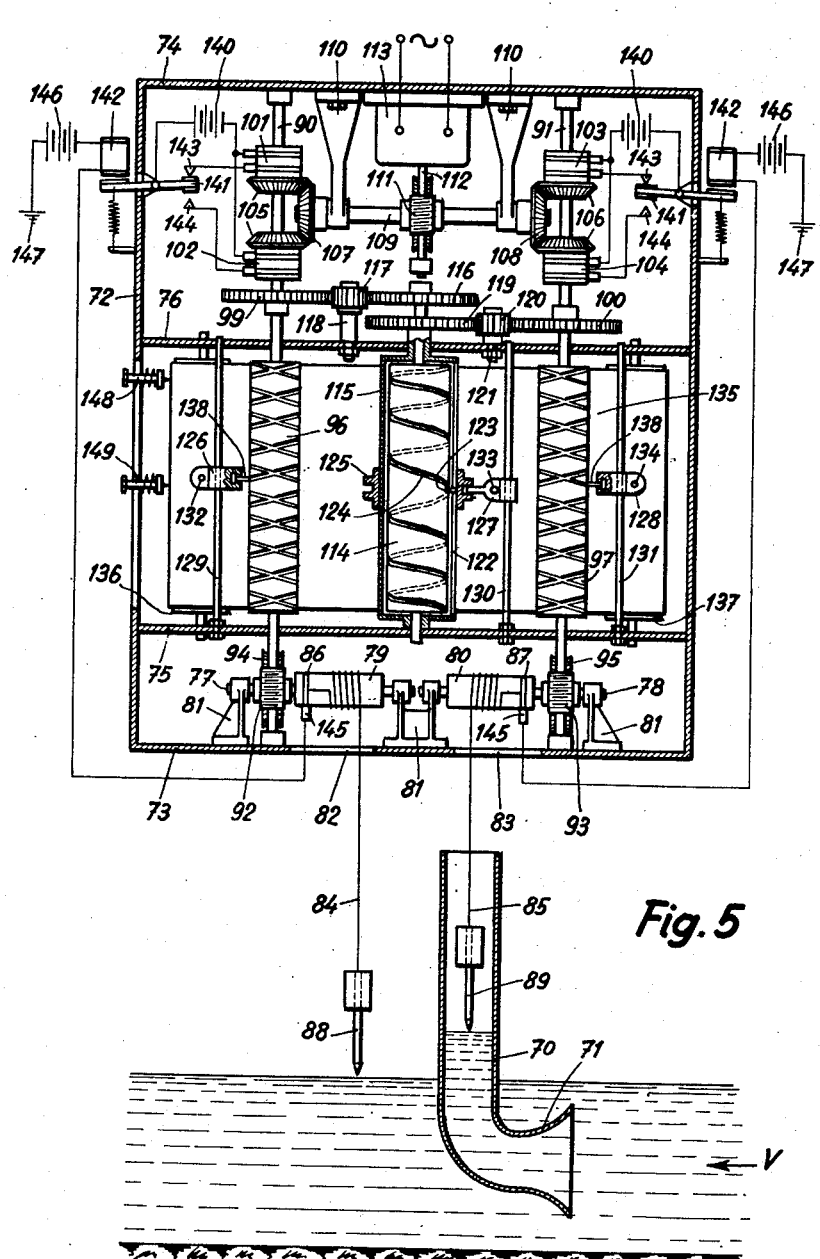
Fig. 5 is a diagrammatical, partly sectional view of an apparatus according to the invention.

A gauging tube of a device generally known as a Pitot tube and adapted to measure the hydrodynamic pressure caused by the velocity V of a river has its mouth 71 immerged into this river. The shape of this mouth is similar to that of the mouth of a trumpet. Tests have shown that the suction pressure caused in the gauging tube 70 by a liquid in a direction opposite to that of the arrow V (Fig. 5) is proportional to the square of the velocity V, as is the hydrodynamic pressure of a liquid flowing in the direction of the arrow V.

Numeral 72 designates a box having a lower wall 73, a top wall 74 and two intermediate walls 75 and 76. Two shafts 77 and 78 fitted with drums 79 and 80, respectively, similar to drum 5 of Fig. 1, are journalled in bearings 81 fixed to the wall 73, which has two slots 82, 83 parallel to the shafts 77, 78. Metallic wires 84, 85 have their upper ends rolled on the drums 79 and 80, respectively, connected to slip rings 86, 87 fixed on these drums, and their lower ends connected to contact rods 88, 89, respectively. Contact rod 88 is adapted to touch the upper surface of the flowing liquid, whilst contact rod 89 is received in the vertically extending portion of the gauging tube 70 for contacting the surface of the liquid therein.

Two vertical shafts 90, 91 are journalled in the walls 73, 74 of the box 72. Worms 92, 93 rigidly fixed to shafts 90, 91, respectively, mesh with worm wheels 94, 95 rigidly fixed to the shafts 77, 78, respectively. Recorder actuating drums 96, 97 rigidly fixed to those portions of the shafts 90, 91 which extend between the intermediate walls 75, 76 are both provided with intercrossing right-handed and left-handed helicoidal grooves 98 (see also Fig. 6). The portions of the shafts 90, 91 which extend between the walls 74, 76 each carry a toothed wheel 99, 100, respectively, rigidly fixed thereto, a pair of electromagnetic clutches 101, 102 and 103, 104, respectively, also rigidly fixed thereto, and pairs of bevel gears 105, 106, respectively, loosely mounted thereon and adapted to cooperate with the electromagnetic clutches. The bevel gears 105 permanently mesh with a bevel gear 107 and bevel gears 106 permanently mesh with a bevel gear 108. The gears 107, 108 are rigidly fixed to an horizontal shaft 109 journalled in brackets 110 fixed to the wall 74, and connected by a worm gearing 111 to the driving shaft 112 of an electric motor 113.

A third recorder actuating drum 114 and a coaxial sleeve 115 are journalled in the walls 75, 76. Drum 114 is rigidly connected with a toothed wheel 116 meshing with a gear 117 meshing with gear 99 and being pivoted at 118 on the wall 76. In a similar way sleeve 115 is rigidly connected with a toothed wheel 119 meshing with a toothed wheel 120 meshing with toothed wheel 100 and being pivoted at 121 on the wall 76. The sleeve 115 has a longitudinal slot 122 which is traversed by a pin 123 engaging a groove 124 (later to be described in detail) provided on the periphery of drum 114 and being fixed to guide ring 125 slidably mounted on sleeve 115.

Figure 6:
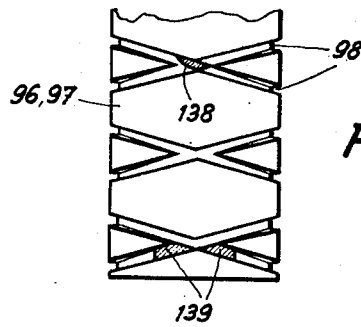
Fig. 6 is an elevational illustration of the apparatus shown in Fig. 5.

Three slides 126, 127, 128 are mounted on guide rods 129, 130, 131, respectively, of polygonal cross section. These slides are fitted with stylus 132, 133 and 134, respectively, extending towards a tape of recording paper 135 the ends of which are rolled on two drums 136, 137 journalled in bearings fixed to the walls 75, 76, drum 137 being adapted to be driven by a clock movement or another synchronous motor (not represented). Pins 138 are revolvably mounted onto the slides 126, 128 and engage the grooves 98 provided on the drums 96, 97. At the ends of the drums 96, 97 these grooves are filled with copper soldered-in, as shown at 139 (Fig. 6), so that the pin 138 when arriving at one end of the left-handed groove, passes into the right-handed groove upon rotation of the drums. The tip of each pin 138 has a cross-section in the shape of a segment of a circle (as shown in Fig. 6) to enable the pin to be automatically revolved over a small angle at such a return point.

The electromagnetic clutches 101—104 are each provided with two slip rings. The "first" slip rings of the clutches 101, 102 are connected in parallel with one pole of a current source 140 the other pole of which is connected to the spring-loaded armature lever 141 of a relay coil having windings 142. The "second" slip rings of the clutches 101, 102 are individually connected with two fixed contacts 143, 144 of this relay. One of the ends of the relay winding 142 is connected to a brush 145 engaging the slip ring 86 connected to the contact rod 88, whilst the other end of the winding is connected to one pole of a current source 146 the other end of which is set to ground at 147. A similar arrangement is provided for the control of the electromagnetic clutches 103, 104.

Figure 7:
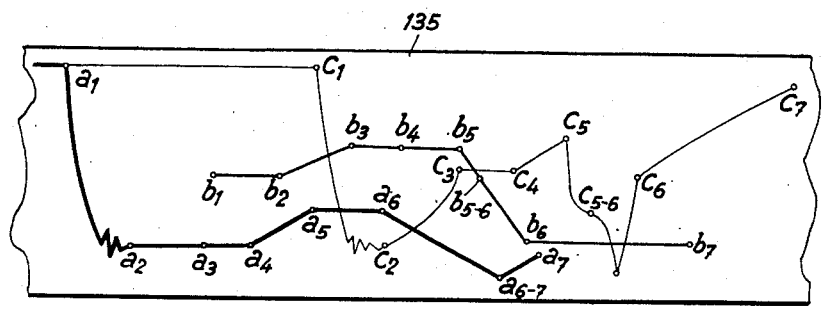
Fig. 7 illustrates some characteristical curves recorded with an apparatus like that represented in Fig. 5.

The operation is as follows:

With motor 113 rotating in one constant direction as long as the apparatus is in use and with the clock movement feeding the paper tape 135, the slides 126, 128 are brought into an arbitrary initial position by holding the contact rods 88 and 89 on the surface of water contained in a vessel set to ground, said surface being at a predetermined level, whilst slide 127 is brought into its zero-position manually. A stylus 148 guided in a slot of casing 72 is then brought to the same level as stylus 138, and a similar stylus 149, at the same level as stylus 133. The stylus 132, 133, 134 draw horizontal lines $a$, $b$, $c$, respectively, which end at the points $a_1$, $b_1$, $c_1$ at the moment when the vessel is taken away (Fig. 7). The horizontal lines recorded by the stylus 148, 149 are in register with said lines ending at $a_1$, $b_1$, $c_1$. The contact rods 88, 89 are then lowered onto the surfaces of the river and of the liquid contained in tube 70, respectively, because, the energizing circuits of the relay windings 142 being open, the clutches 101, 103 transmit the rotation of shaft 109 to the shafts 90, 91, to rotate the drums 79, 80 in a direction causing unrolling of the wires 84, 85. The rotations of the shafts 90, 91 are also transmitted to the drum 114 and to sleeve 115, these two parts rotating in the same direction at the same speed. Ring 125 is therefore not shifted on sleeve 115 and slide 127 and stylus 133 are not moved, whilst the stylus 132 and 134 are moved by drums 96, 97, respectively. The line portions recorded on the tape 135 are those extending between the points $a_1$—$a_2$, $b_1$—$b_2$ and $c_1$—$c_2$, respectively. The velocity V is supposed to be zero; the points $a_2$ and $c_2$, therefore, are located on the same horizontal line.

Assuming that the level of the river remains unchanged for a certain period during which the flow velocity of the water increases from a zero-value $V_2$ to a value $V_3$, the contact rod 88 will not change its position, nor will the slide 126 and the stylus 132 controlled thereby. However, the level of the liquid in the gauging-tube 70 rises, causing the mechanism controlling the position of the contact rod 89 and of the slide 128 and stylus 134 to change the positions of these parts. It is well known that the height H by which the level of the liquid contained in the tube 70 is raised above that of the surface of the river is given by the equation.

$$H = k_1 . V^2$$

where $k_1$ is a constant value to be determined by tests, and V the velocity.

If the direction of flow is opposite to that represented in the drawing, the corresponding equation will be:

$$H = k_2 . V^2$$

where $k_2$ is another constant value to be determined by tests.

In the latter case, the level of the liquid contained in the tube 70 will be below that of the surrounding surface.

Figure 4:
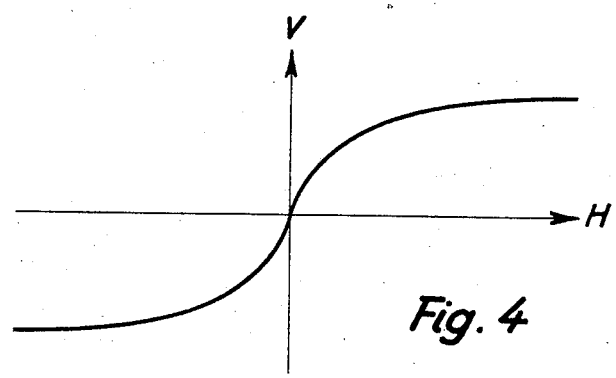
Fig. 4 represents a diagram of a physical function.

The diagram representing the relation between the values of V and those of H will therefore comprise two branches of parabolas, as shown in Fig. 4. When a sheet of paper bearing these curves, is wound on the cylinder 114, with the direction V parallel to the axis of the cylinder, said curves will exactly register with the groove 124 provided on this cylinder, or rather, this groove is made accordingly: It is a "helicoidal groove having a parabolic pitch." It will now be easy to understand that if the velocity V of the moving liquid grows constantly, the corresponding line portion $b_2$—$b_3$ recorded on the paper tape 135 will be a straight inclined line whilst the line $c_2$—$c_3$, representing the height H, is represented by a branch of a parabola.

If thereafter the level of the river as well as its flow velocity remain constant, portions of curves $a_3$—$a_4$, $b_3$—$b_4$ and $c_3$—$c_4$ will be recorded, all these portions being horizontal straight lines.

If subsequently the level of the river rises constantly, whilst its flow velocity remains unchanged, curve portions as those indicated at $a_4$—$a_5$, $b_4$—$b_5$ and $c_4$—$c_5$ are recorded.

Assuming that the water level remains unchanged during a subsequent period, during which the flow velocity drops constantly to a zero value and thereafter to a negative value, according to line $b_5$—$b_{5-6}$—$b_6$, line $a_5$—$a_6$ will be a horizontal straight line, whilst line $c_5$—$c_6$ will be composed of three parabolic portions. Point $c_{5-6}$ corresponds to velocity zero, the return point at the lower edge of the tape being caused by pin 138 passing from the right-handed groove on drum 97 to the left-handed groove thereon (or inversely). To calculate the hydrodynamic pressure difference between points $c_5$ and $c_6$, one has merely to add the heights of these points above the horizontal line passing through the return point.

If thereafter the level of the river is lowered constantly, whilst the flow velocity remains unchanged, the curve $a_6$—$a_7$ may be formed as shown, with a return point $a_{6-7}$ caused by pin 138 reaching the lower end of the drum 96. The difference of levels may again be obtained by adding the diagram heights $a_6$, $a_7$. The velocity curve is represented by a horizontal line $b_6$—$b_7$, whilst line $c_6$—$c_7$ is an inclined straight line.

It is easily to be understood that variations of the level of say 1 millimeter may produce a movement of the slides 126 and 128 over 10 millimeters, for example, so that the measuring accuracy is very great. A similar accuracy may be obtained in the velocity-measurement.

Whilst in the above discussions simple changes of the water level and of the flow velocity were assumed for the sake of clarity of explanation, it is obvious that the changes of water level and of water velocity may occur simultaneously and independently of each other in any manner without changing the method of operation of the apparatus. It is an object of the present invention to provide means for recording the curves indicating the variations of the water level, of those of the water velocity and of those of the level summarized with those of the hydrodynamic pressure, on a single tape, the curves instantaneously illustrating the changes of flow conditions of the river.

Although the foregoing description is necessarily of a detailed character, in order that the invention may be completely set forth, it is to be understood that the specific terminology is not intended to be restrictive or confining and that various rearrangements of parts and modifications of details may be resorted to without departing from the scope or spirit of the invention as herein claimed.

What I claim is:

1. An apparatus for measuring levels of non-conductor liquids, comprising in combination, a stationary revolvable shaft, an insulating drum rigidly connected to said shaft, two metallic wires having each an end portion wound on said drum, two contact rods individually suspended on and connected to the other ends of said wires, a float having a chamber communicating with the liquid and having a bottom wall comprising a depressed portion, an electrically conductive liquid in said depressed portion and adapted to be engaged by said contact rods, two slip rings fixed on said drum and individually connected with said wire portions, two fixed brushes individually engaging said slip rings, a relay having a coil, electric conduit means comprising said conductive liquid, said contact rods, said wires, said slip rings, said brushes, said relay coil, and a current source, reversible rotary driving means for said shaft connected with said relay for controlling the direction of rotation of said shaft for lowering said contact rods when said circuit means are not current-carrying and for raising said contact rods when said circuit means are current-carrying, and means indicating the extent of rotation of said shaft.

2. An apparatus for measuring the level, the velocity, and the volume of an electrically conductive liquid flowing through a channel, comprising in combination, a Pitot tube; two liquid level measuring apparatus, one for measuring the level of the flowing liquid, the other for measuring the level of the liquid in said Pitot tube, each of these two apparatus comprising a stationary revolvable shaft, an insulating drum rigidly connected to said stationary shaft, a metallic wire having an end portion wound on said drum, a contact rod suspended on the other end of said wire, a slip ring on said drum, connected to said wire portion, a fixed brush engaging said slip ring, a relay having a coil, electric circuit means comprising means permanently in contact with said liquid, said contact rod, said wire, said slip ring, said brush, said relay coil, and a current source, reversible rotary driving means for said stationary shaft connected with said relay for controlling the direction of rotation of said shaft for lowering said contact rod when said circuit means are not current-carrying and for raising said contact rod when said circuit means are current-carrying, an actuating drum operatively connected with said insulating drum to be rotated therewith, a stylus-carrying slide guided for movement in a direction parallel to the rotation axis of said actuating drum; a third actuating drum operatively connected with the actuating drum of the apparatus measuring the level of the liquid to be rotated with said last mentioned drum, a helicoidal groove having a parabolic pitch on said third drum; a sleeve coaxial with and surrounding said third drum and operatively connected with the actuating drum of the apparatus measuring the level of the liquid in said Pitot tube so as to be rotated with said actuating drum, said sleeve having a longitudinal slot; a ring surrounding said sleeve and being coaxial slidable thereon and having a circumferential groove; a pin being fixed to said ring, traversing said longitudinal slot and engaging the groove on the third actuating drum, a third stylus-carrying slide guided to move parallel to the rotation axis of said third drum and engaging said circumferential groove, a recorder-tape arranged for engagement by the stylus of said three stylus-carrying slides, and means for advancing said recorder-tape in a direction substantially perpendicular to the paths of said stylus-carrying slides.

3. An apparatus according to claim 2, said driving means comprising an electric-motor having a driving shaft, a transversal shaft, a worm gearing interconnecting said driving shaft with said transversal shaft, bevel gears rigidly fixed to both ends of said transversal shaft, two drum shafts perpendicular to said transversal shaft and individually rigidly connected with said first two actuating drums, and two pairs of bevel gears individually loosely mounted on said drum shafts and individually meshing with said bevel gears, two pairs of electromagnetic clutches individually rigidly connected with said drum shafts adjacent to said loosely mounted bevel gears and controlled by said relays for individually clutching a bevel gear to its shaft.

4. An apparatus according to claim 2, said first two actuating drums having at their periphery intercrossing left-handed and right-handed helicoidal grooves closed adjacent to the intercrossings at the ends of the recorder-drums, and pins individually and revolvably mounted on the corresponding stylus-carrying slides and having each a tip of segment-shaped cross section engaging said helicoidal grooves.

5. An apparatus for measuring the level of a liquid, comprising, in combination, a rotatable shaft, two electrically conductive flexible members adapted to be wound on and unwound from said shaft, each member having one end connected with said shaft and having a free end, a float floating on the liquid whose level is to be measured, an electrically conductive liquid in said float, a contact means suspended at the free ends of said flexible members and vertically yieldingly connected with said float, said contact means comprising two contact rods individually electrically connected with said flexible members and electrically insulated from one another and having points positioned adjacent to the surface of the electrically conductive liquid in said float, an electric circuit comprising a solenoid, a source of electricity connected through said solenoid in series with said two flexible means, said circuit being closed and said solenoid being energized upon contact of said points with the liquid in said float, power means connected with said shaft for rotating same and comprising means adapted to be actuated by said solenoid for controlling the direction of rotation of said shaft, the latter being rotated to unwind said flexible members from said shaft upon removal of said points from the liquid in said float, and being rotated to wind said flexible members on said shaft upon contact of said points with the liquid in said float, and means connected with said shaft for indicating the number of revolutions of said shaft made in either direction of rotation.

OLAF FALK.

References Cited in the file of this patent

UNITED STATES PATENTS

| Number | Name | Date |
| --- | --- | --- |
| 803,029 | Threlfall | Oct. 31, 1905 |
| 1,571,293 | Moss | Feb. 2, 1929 |
| 2,032,016 | Hitner | Feb. 25, 1936 |
| 2,053,938 | Barker | Sept. 8, 1936 |
| 2,101,165 | Cole et al. | Dec. 7, 1937 |
| 2,380,436 | Holdman | July 31, 1945 |
| 2,423,888 | Hueser | July 15, 1947 |
| 2,480,490 | Mark | Aug. 30, 1949 |
| 2,483,333 | Cannon | Sept. 27, 1949 |

FOREIGN PATENTS

| Number | Country | Date |
| --- | --- | --- |
| 409,102 | Great Britain | Apr. 26, 1934 |